(12) United States Patent
Moon

(10) Patent No.: US 6,480,247 B1
(45) Date of Patent: Nov. 12, 2002

(54) COLOR-FILTERLESS LIQUID CRYSTAL DISPLAY DEVICE

(75) Inventor: Jeong Min Moon, Kyounggi-do (KR)

(73) Assignee: LG Philips LCD Co., Ltd., Seoul (KR)

( * ) Notice: Subject to any disclaimer, the term of this patent is extended or adjusted under 35 U.S.C. 154(b) by 69 days.

(21) Appl. No.: 09/692,113

(22) Filed: Oct. 20, 2000

(30) Foreign Application Priority Data

Oct. 22, 1999 (KR) .............................................. 99-46137

(51) Int. Cl.⁷ .............................................. G02F 1/1335
(52) U.S. Cl. ............................ 349/65; 349/61; 349/106
(58) Field of Search ........................... 349/61, 65, 106; 253/48, 49, 82, 85, 86, 84

(56) References Cited

U.S. PATENT DOCUMENTS

| | | | |
|---|---|---|---|
| 4,772,885 A | * 9/1988 | Uehara et al. | 349/106 |
| 5,825,440 A | * 10/1998 | Kim | 349/61 |
| 6,086,212 A | * 7/2000 | Onishi et al. | 349/65 |
| 6,092,904 A | * 7/2000 | Tai et al. | 362/31 |

FOREIGN PATENT DOCUMENTS

JP    06138459    5/1994

* cited by examiner

Primary Examiner—James A. Dudek
(74) Attorney, Agent, or Firm—Birch, Stewart, Kolasch & Birch, LLP

(57) ABSTRACT

A color-filterless liquid crystal display device is capable of realizing a full color without any color filters in sub-pixels of the display. In the device, a three primary color selector is arranged at a light incident surface of a light guide to generate three primary color light beams sequentially, color-by-color. The three primary color selector may be provided on one or more sides of a light guide in a back light, or it may be provided above the back light. Use of a color filter is eliminated to reduce a manufacturing cost and improve a process yield and an aperture ratio of the device. Also, independent light sources corresponding to three primary colors are replaced by a single light source, so that light utilization efficiency may be optimized and a slim-type LCD may be provided.

24 Claims, 18 Drawing Sheets

THREE ORIGINAL COLOR LIGHT SOURCE

COLOR-FILTERLESS LIQUID CRYSTAL DISPLAY DEVICE

BACKGROUND OF THE INVENTION

1. Field of the Invention

This invention relates to a liquid crystal display, and more particularly to a liquid crystal display that realizes full color without using color filters in sub-pixels by sequentially providing different colors of light to the display.

2. Description of the Related Art

Generally, liquid crystal displays (LCD's) tend toward wider and wider application by virtue of their characteristics such as low weight, thin form factor, and low power consumption. Accordingly, LCD's have been used for office automation equipment, video/audio equipment, etc. The LCD controls an amount of transmitted light in response to data signals applied to a number of control switches arranged in a matrix, to display a desired picture on the screen.

Referring to FIG. 1, the conventional LCD includes a back light unit 10 for generating and uniformly supplying a light beam to the liquid crystal panel 50. The liquid crystal panel 50 includes a lower polarizer 22 arranged at the upper portion of back light unit 10 to change a polarization characteristic of the light beam. A lower substrate 24 is arranged on the lower polarizer 22, and thin film transistors (TFT's) 38 for applying a signal controlling a transmitted amount of the light beam are arranged in a matrix configuration. A liquid crystal layer 28 is provided at the upper portion of the lower substrate 24, and a common electrode layer 30 is provided on the liquid crystal layer 28. Color filter layers 36 are provided at the upper portion of the common electrode layer 30. An upper substrate 32 is provided on the color filter layers 36, and an upper polarizer 34 is arranged on the upper substrate 32 to convert a polarization characteristic of the light beam.

The back light unit 10 consists of a light source (not shown) for generating a light beam, a light guide (not shown) for uniformly guiding the light beam from the light source into a liquid crystal panel, and a reflector (not shown) arranged at the lower portion of the light guide to reflect a light beam from the bottom or side surfaces of the light guide toward the liquid crystal panel 50. By such a configuration, a light beam from the back light unit 10 progresses uniformly toward the liquid crystal panel 50. An exemplary energy distribution spectrum of a white light beam generated from the back light unit 10 is illustrated in FIG. 2.

The white light beam going from the back light unit 10 into the liquid crystal panel 50 is polarized by the lower polarizer 22. When the polarized light beam passes through a liquid crystal 28 controlled by the TFT 38, the polarization state of the polarized light beam is changed. More specifically, if the TFT 38 is turned on, then an image signal is applied via the TFT 38 to a pixel electrode 26. At this time, the liquid crystal 28 has a different orientation state in response to a potential between the pixel electrode 26 and the common electrode 30. A light beam changed in a polarization state by virtue of the liquid crystal layer 28 passes through the color filter layer 36, which transmits only wavelengths of light (i.e., colors) corresponding to each color filter element.

An exemplary spectrum of a light beam transmitted by the color filters is illustrated in FIG. 3. As shown in FIG. 4, one pixel 42 has sub-pixels 40 corresponding to red (R), green (G) and blue (B) colors. In other words, the three sub-pixels 40 make up a single pixel 42. As described above, a light beam transformed into a desired color by the color filter layer 36 passes through the upper substrate 32, and thereafter goes into the upper polarizer 34 to display a picture corresponding to an image signal.

The conventional color-filter LCD has a high manufacturing cost because the color filter material is expensive. Also, the conventional color-filter LCD has a problem that a resolution of a displayed image is deteriorated, since one pixel consists of three sub-pixels. Also, a production yield is lower, since a process of configuring the sub-pixels and a process of forming the color filter layers are additionally required. In order to solve these problems, a color-filterless LCD employing a sequential lighting system as shown in FIG. 5 has been suggested. As used herein, the term "color-filterless" refers to a display that realizes full color without using color filters in sub-pixels of a liquid crystal panel, e.g., as shown in FIG. 4.

Referring to FIG. 5, the conventional color-filterless LCD includes three primary color light sources 12R, 12G and 12B turned on sequentially to generate sequential light beams corresponding to R, G and B colors. An optical medium 13 uniformly distributes the sequential light beams from the light sources. The liquid crystal panel 50 is not provided with any color filters. In order to implement a color image from such a structure, the back light unit 10 is provided with the three primary light sources 12R, 12G and 12B. In this case, a reflector (not shown) is arranged under the optical medium 13 and the three primary color light sources 12R, 12G and 12B. A diffusing sheet 66 and the like are arranged on the optical medium.

A method of driving the color-filterless LCD employing a sequential lighting system will be described below in conjunction with FIG. 6. As shown in FIG. 6, in order to display an image 6 in color, an R light beam is transmitted by a portion of the liquid crystal panel 50 corresponding to an R color of the entire image. In turn, a G light beam is transmitted by a portion corresponding to a G color of the entire image. Finally, a B light beam is transmitted by a portion corresponding to a B color of the entire image.

In order to realize a full color image, the three primary color light sources are sequentially turned on color-by-color, and the pixels of the liquid crystal panel 50 are controlled to have a transmissivity corresponding to a color brightness of the turned-on light source. When any one of the three color light sources 12R, 12G, and 12B has been turned on, other color light sources are turned off or have a minimum brightness. When such sequential turned-on times are controlled to have a very short time interval, an observer does not sense a turning on and off of the displayed image, but views a full color image. Since the color-filterless LCD shown in FIG. 5 does not use any color filters, a manufacturing cost of the liquid crystal panel can be reduced. Also, because it permits an expression of a picture corresponding to an image signal using only single pixels without any sub-pixels, the LCD's resolution, brightness and aperture ratio can be improved.

The conventional color-filterless LCD may be configured by a back light directly under the liquid crystal panel 50 as shown in FIG. 5, and the back light includes a light guide 14 under the liquid crystal panel 50 and lamps to the side of the light guide 14 as shown in FIGS. 7A and 7B. However, since the conventional color-filterless LCD has to turn on the three primary color independent light sources during a short period, the number of light sources as well as a size of the light source driver is increased. Thus, the conventional color-filterless LCD has problems of a complex driving system and a short life. Also, the back light under the liquid crystal panel 50 has a disadvantage in that it has large thickness and high power consumption. On the other hand, the back light to the side of liquid crystal panel 50 can achieve a thin form factor, low weight and low power consumption, but has a difficulty in arranging the three primary color light sources efficiently as shown in FIG. 7B. As a result, a novel strategy for overcoming the above-mentioned problems has been required.

SUMMARY OF THE INVENTION

Accordingly, it is an object of the present invention to overcome one or more disadvantages of the conventional displays noted above.

In order to achieve these and other objects of the invention, a liquid crystal display device according to an embodiment of the present invention includes a liquid crystal panel; a light source to generate light for illuminating the liquid crystal panel; a light guide to guide light from the light source to the liquid crystal panel; and a three primary color selector optically coupled to the light source to sequentially generate three primary color light beams from incident light from the light source.

A back light unit according to another embodiment of the present invention includes a light source to generate light; a light guide to guide light from the light source; and a color selector arranged in an optical path of the light source to sequentially transmit a plurality of colors within incident light from the light source.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
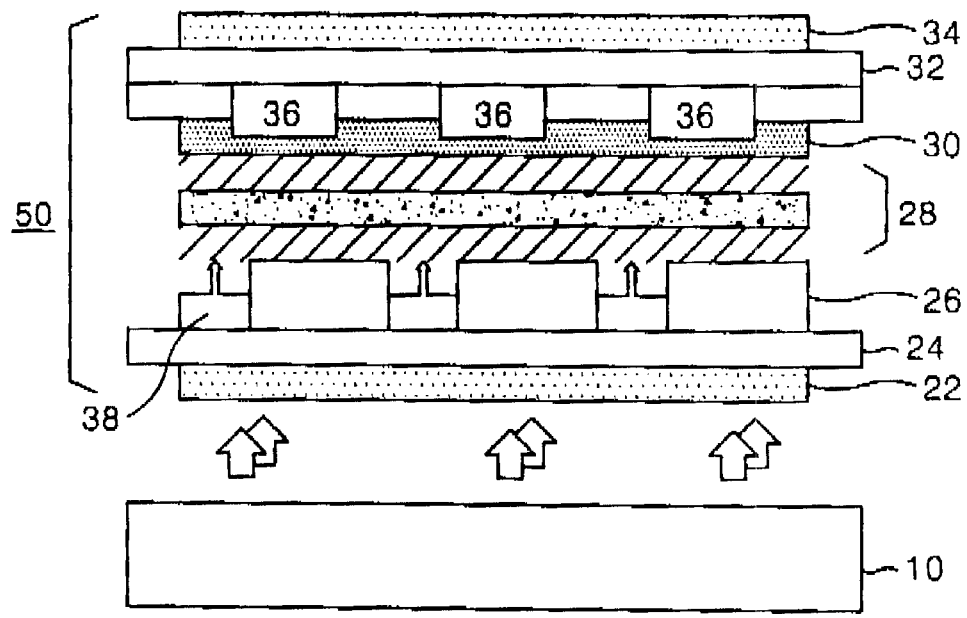
FIG. 1 is a schematic section view showing a structure of a conventional color-filter liquid crystal display device.
Figure 2:
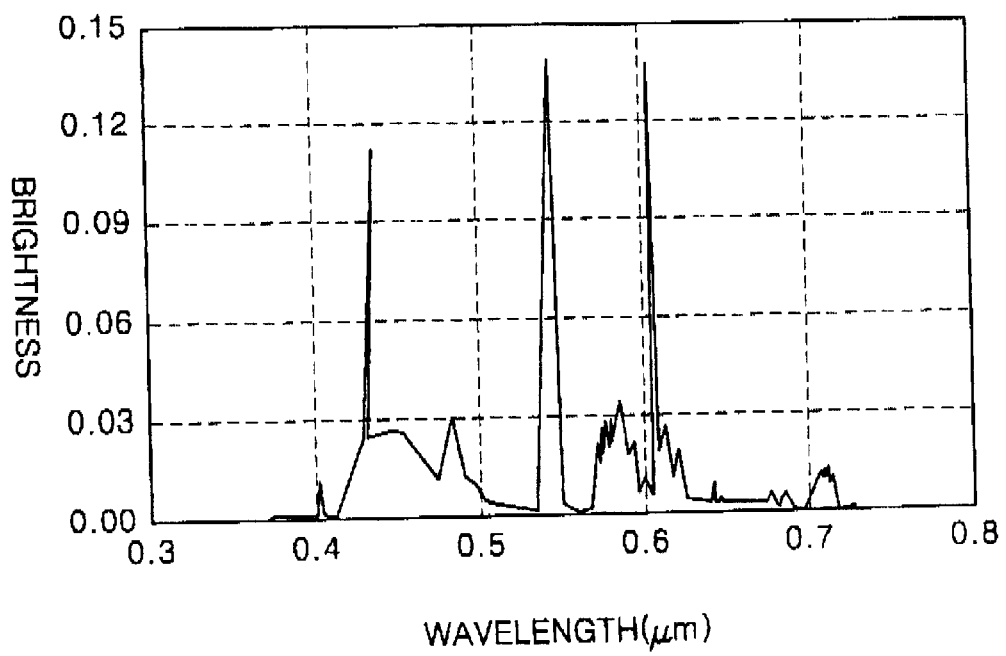
FIG. 2 is a graph representing an energy distribution spectrum of the back light unit in FIG. 1.
Figure 3:
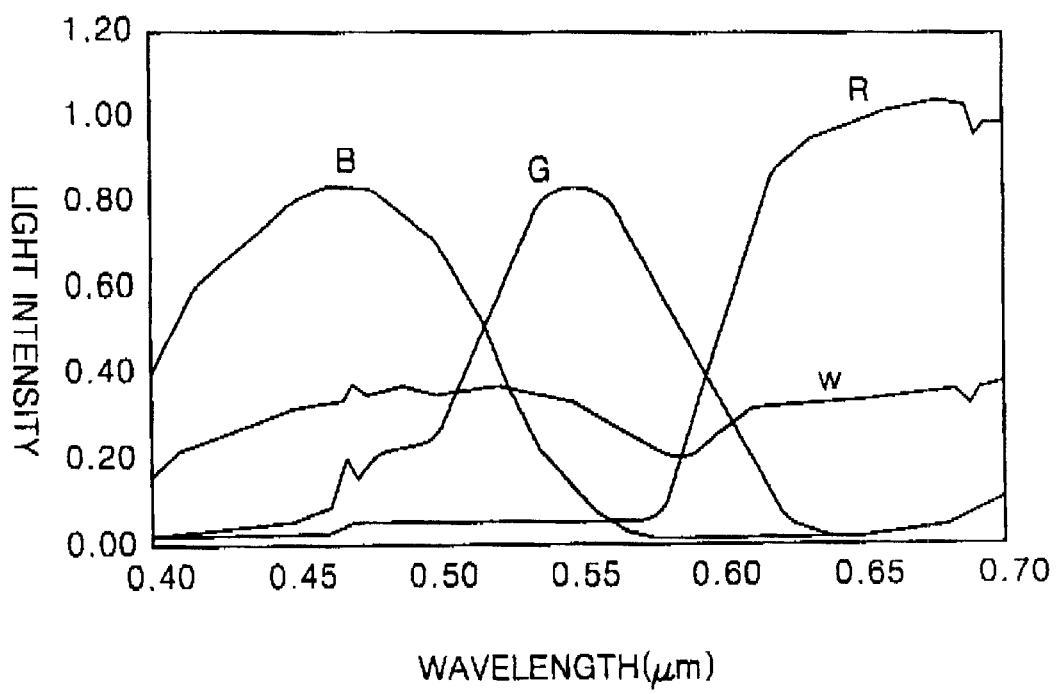
FIG. 3 is a graph representing light-transmission spectrum characteristics of the color filters in FIG. 1.
Figure 4:
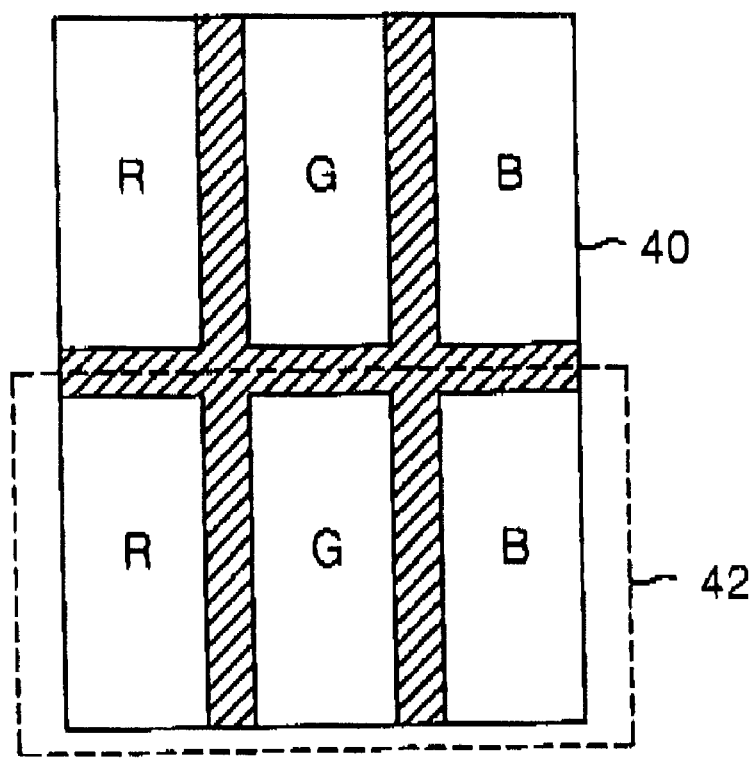
FIG. 4 is a schematic diagram showing a pixel structure of a conventional color-filter liquid crystal display device.
Figure 5:
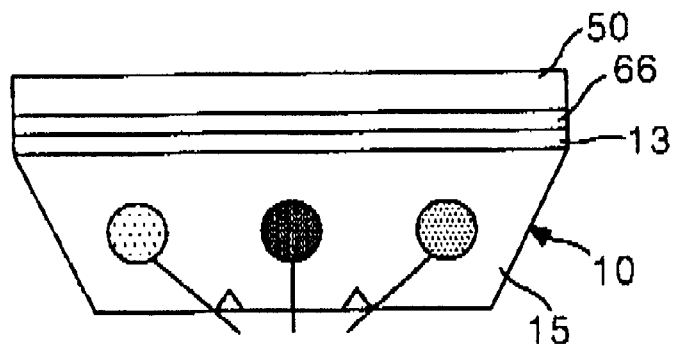
FIG. 5 is a section view showing a configuration of a conventional color-filterless liquid crystal display device employing a sequential light system.
Figure 6:
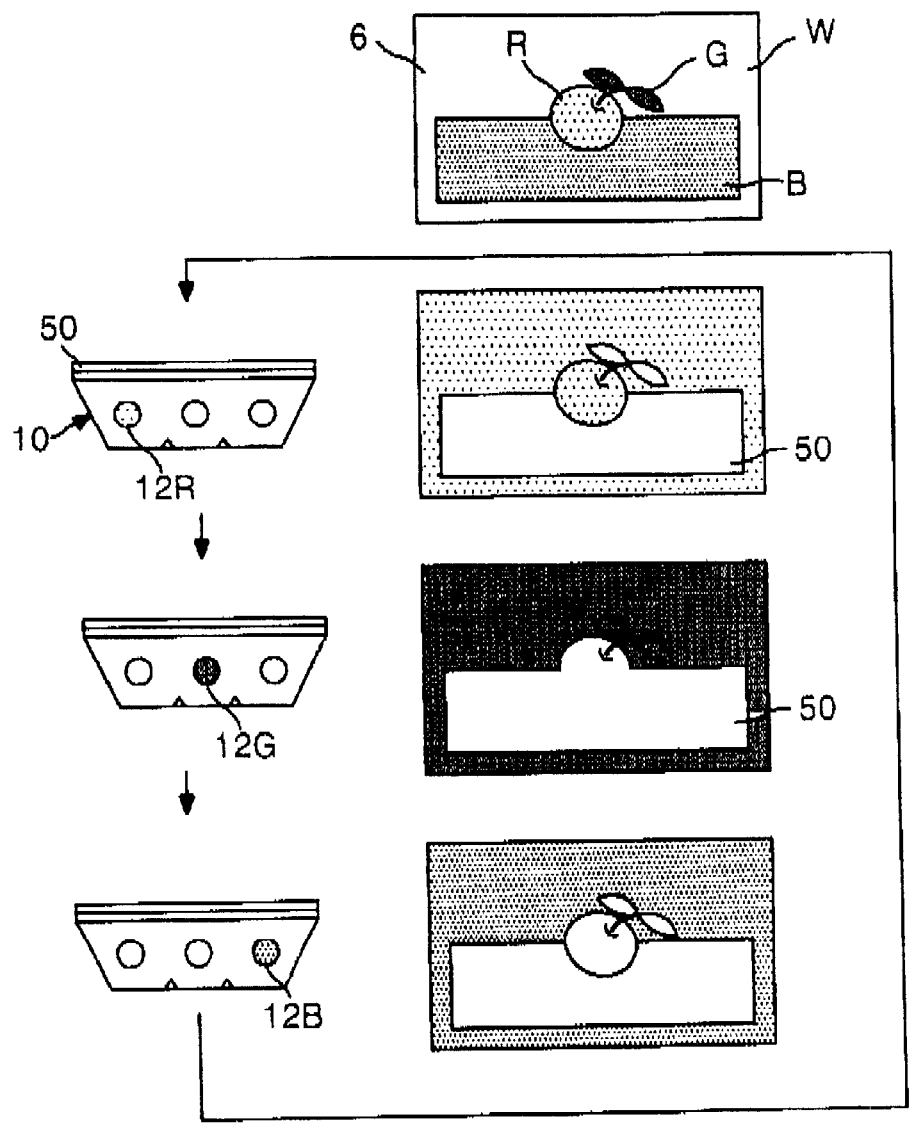
FIG. 6 is a view for explaining a driving method of the color-filterless liquid crystal display device.
Figure 7A:
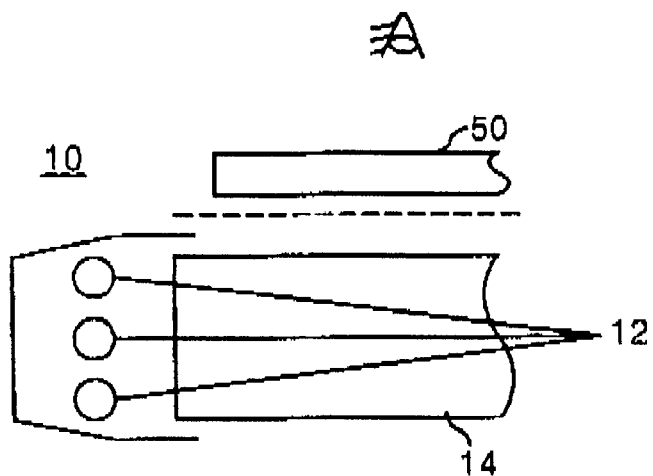
FIGS. 7A and 7B are schematic views showing a structure a back light unit of side light system in the liquid crystal display device in FIG. 6.
Figure 7B:
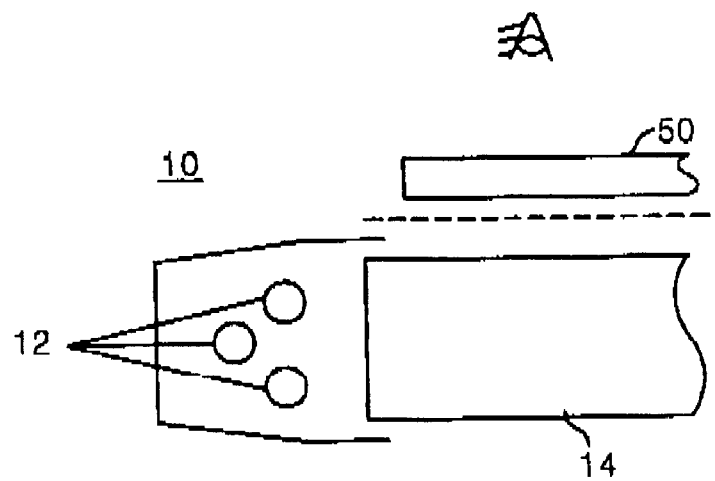
Figure 8A:
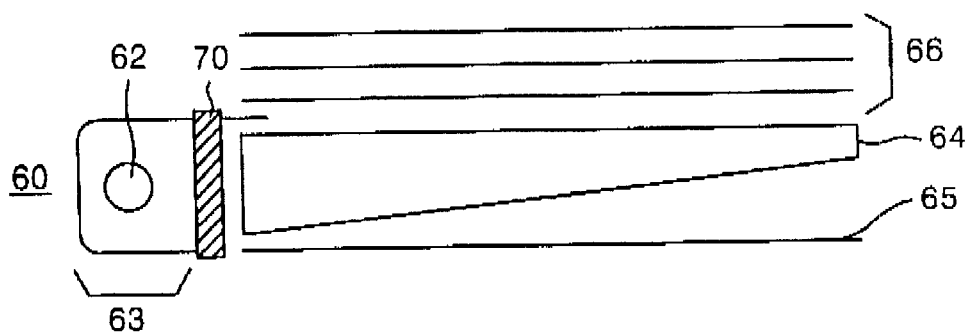
FIGS. 8A and 8B are schematic section views showing a configuration of back light unit of a color-filterless liquid crystal display device according to an embodiment of the present invention.
Figure 8B:
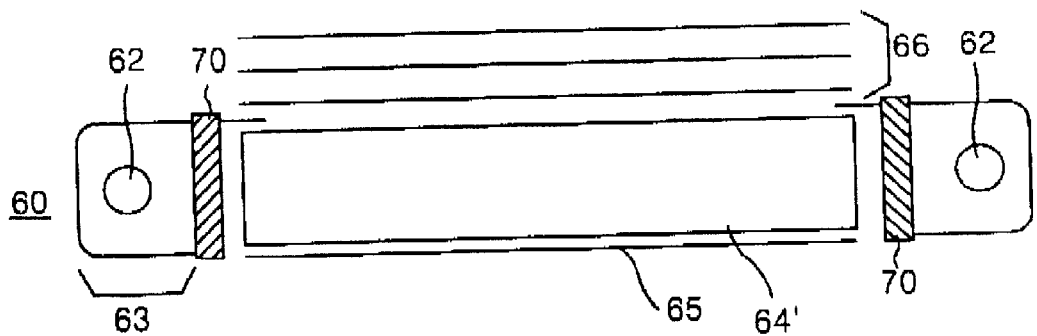

Referring to FIG. 8A, there is shown a backlight unit 60 of a color-filterless liquid crystal display (LCD) according to an embodiment of the present invention. As used herein, the term "color-filterless" refers to a display that realizes full color without using color filters in sub-pixels of a liquid crystal panel, e.g., as shown in FIG. 4. The corresponding liquid crystal panel 50 is not shown in FIGS. 8A and 8B. The back light unit 60 includes a three primary color selector 70 arranged at an incident surface, which is a boundary between a light generator 63 and a wedge-shaped light guide 64. The light generator 63 contains a light emitting element 62. The back light unit 60 may also include a number of sheets 66 for diffusing the light from the light guide 64. The sheets applied to diffusing sheets and optical sheets such as freeze, and so on. The back light unit 60 also includes a reflector 65 at the bottom thereof. As shown in FIG. 8B, the light guide 64' may also have a flat panel shape. The selector 70 selects three primary light beams sequentially one color-by-one color from the light generated by the light generator 63. The three primary color selector 70 may be implemented by several design schemes as will be described below.

Figure 9A:
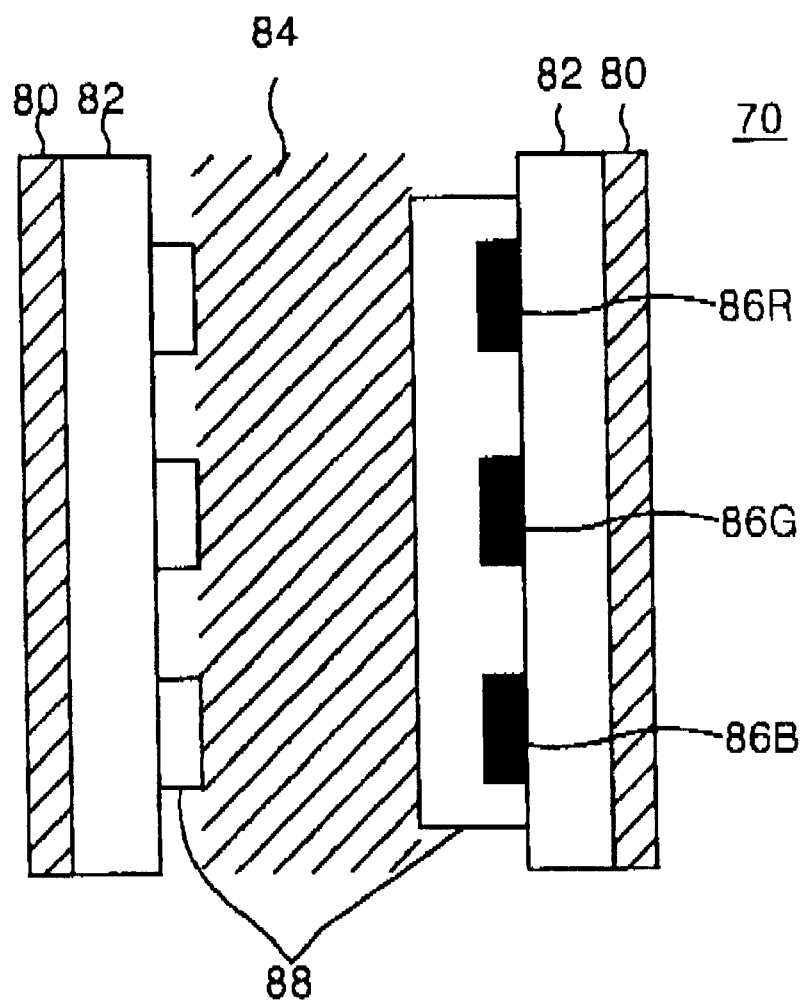
FIG. 9 to FIG. 13 are section views showing embodiments of the three primary color selector in FIG. 8A and 8B.
Figure 9B:
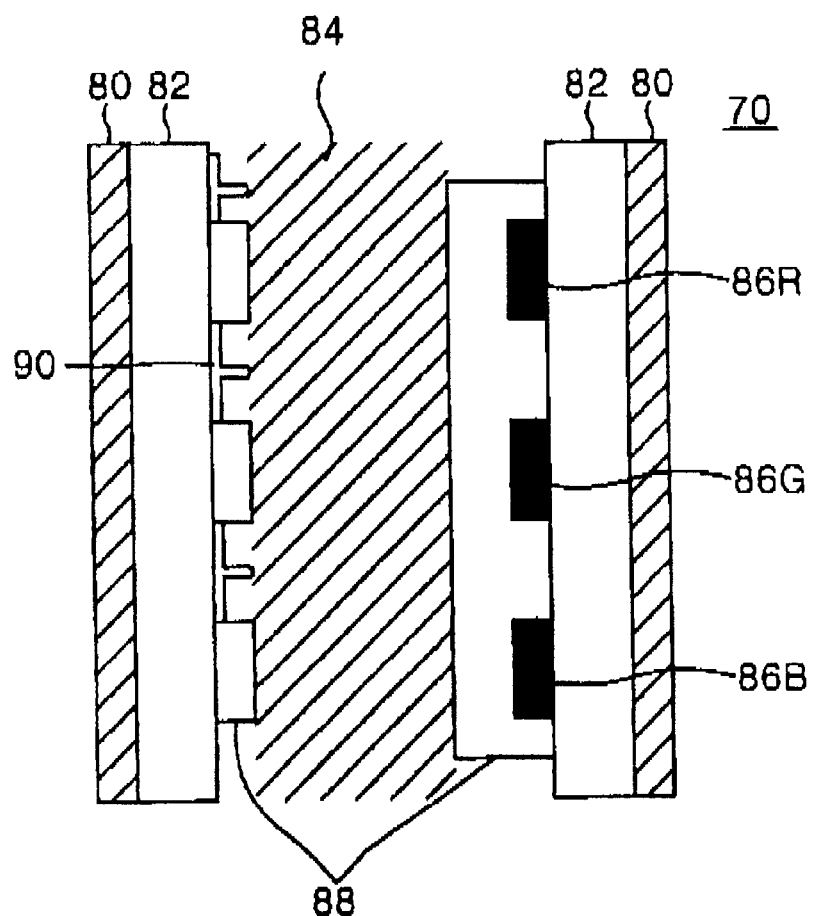

First, as shown in FIG. 9A, the three primary color selector 70 may include color filters 86R, 86G and 86G having a different characteristic for transmitting each wavelength corresponding to the three primary colors arranged to drive a liquid crystal 84 of the selector. This selector 70 includes polarizers 80, substrates 82, liquid crystal material 84, and driving/common electrodes 88 in accordance with standard LCD designs. In this case, the liquid crystal 84 is driven to display only a minimum brightness and a maximum brightness, and it is unnecessary to make a gray scale display. Only one of the sub-areas corresponding to 86R, 86G, and 86B passes light at a time. Though FIG. 9A shows three sub-areas for the purposes of illustration, the selector 70 may have as many sub-areas as necessary to produce uniform illumination for a given color. It may only be necessary to have three sub-areas for the side-illuminated design in FIGS. 8A and 8B. However, the planar selector 70' in FIGS. 15A–15C, for example, may have a relatively large number of sub-areas arranged in a matrix to provide a certain color of light uniformly across the plane of the selector. As shown in FIG. 9B, thin film transistors 90 also may be provided according to a designer's choice.

Figure 10:
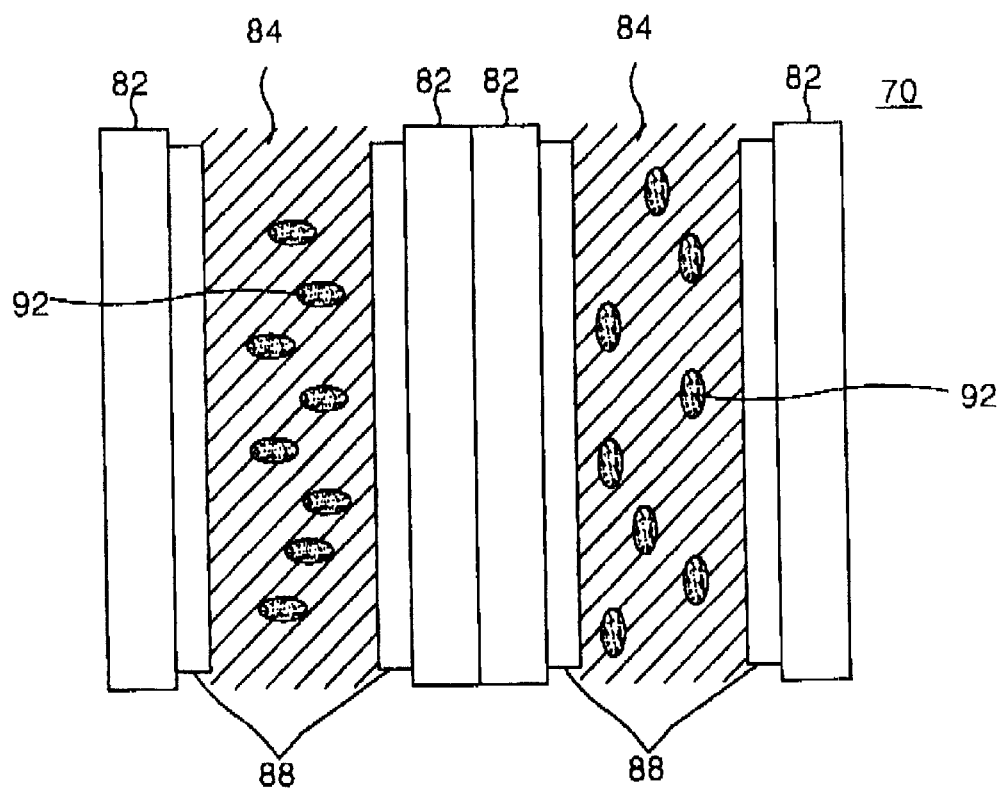

Second, as shown in FIG. 10, the three primary color selector 70 may include dichroic dyes 92 having a different transmission characteristic for each wavelength in accordance with the direction of incident light. The dichroic dyes 92 are blended with a liquid crystal 84 within one or more miniature pixels. When the pixel(s) are driven, a transmission characteristic for each desired wavelength of light is controlled. Three primary colors can be sequentially applied by adjacently disposing one or more liquid crystal layers blended with such dichroic dyes 92.

Figure 11:
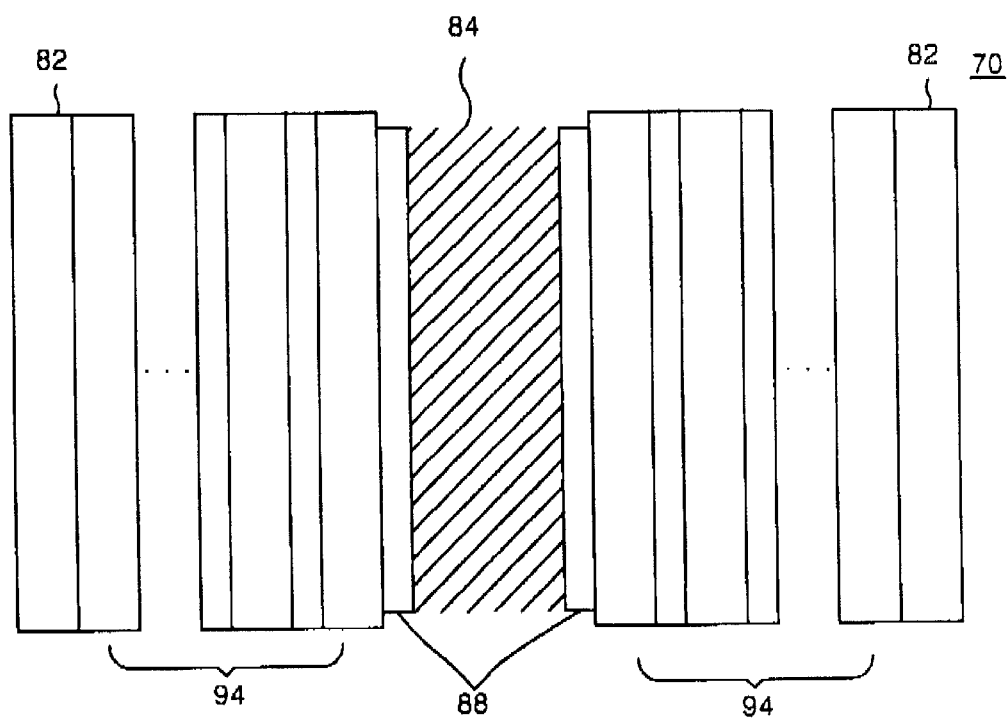
Figure 12:
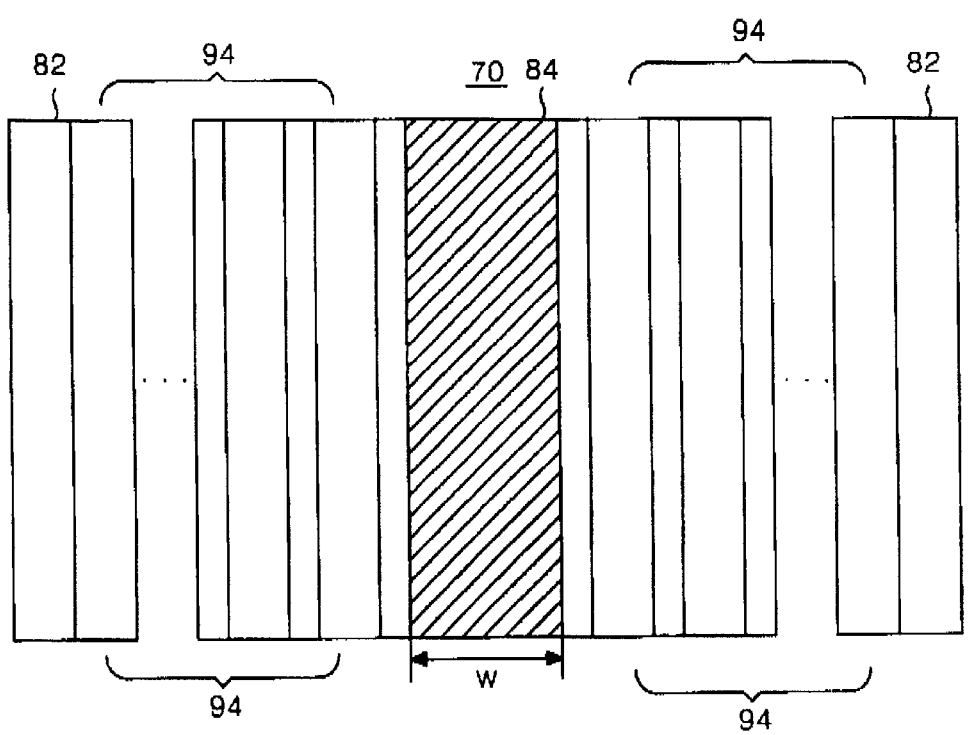

Third, as shown in FIG. 11, the three primary color selector 70 may include materials having a different refractive index disposed into a plurality of layers 94 to control a refractive index. In this case, different refractive index material layers 94 are arranged at the upper and lower portions of a liquid crystal layer 84 to control a refractive index of the liquid crystal layer 84, thereby controlling a transmission characteristic of light beams. Alternatively, as shown in FIG. 12, a thickness W or position of the liquid crystal layer 84 is adjusted by an accousto-optical or a very minute electro-mechanical structure to control a transmissivity for each wavelength of light beams.

Figure 13:
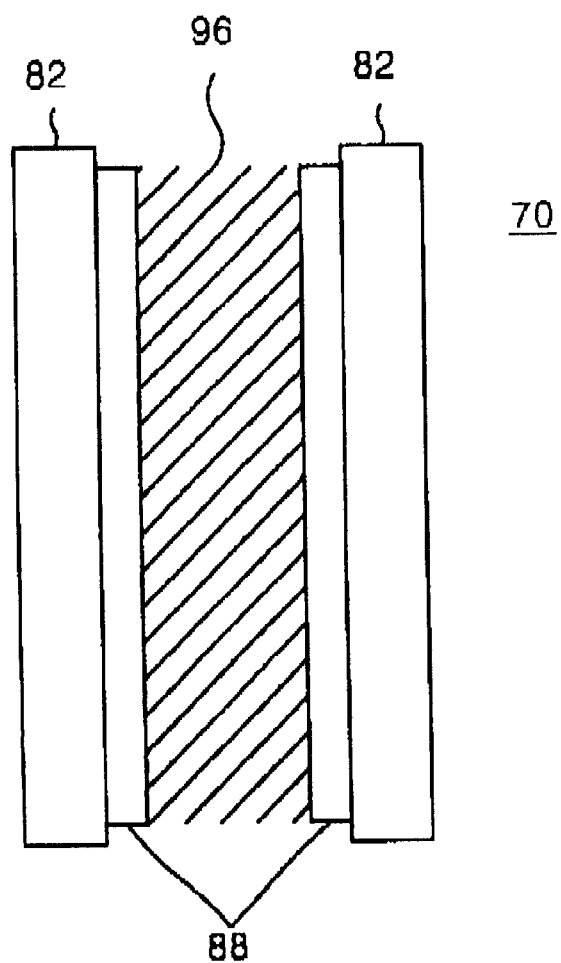

Fourth, as shown in FIG. 13, in the three primary color selector 70 only a specific wavelength band of light beams is transmitted while the remaining wavelength band of light beams is reflected or refracted in a direction having no effect on the transmitted light with the aid of a holographic optical element 96. Accordingly, it becomes possible to control a transmissivity for each desired wavelength of light beams. An active matrix addressing method or a simple matrix addressing method may be available for driving of a LCD used in the three primary color selector. Since the LCD applied thereto does not have to display a intermediate gray scale, a driving method can be very simplified.

Those skilled in the optical arts will appreciate the finer details of constructing and driving the above-described three primary color selectors 70. Variations on the designs in FIGS. 9A–13 which selectively pass desired wavelengths from incident white light are contemplated, and fall within the intended scope of the present invention.

A shape of the light guide contacting the three primary color selector 70 will be described below in conjunction with FIGS. 8A and 8B. In the side light system of FIG. 8A, the three primary color selector 70 is provided at one incident surface of the light guide to sequentially generate three primary colors. On the other hand, in the side light system of FIG. 8B, the three primary color selector 70 is provided adjacent to at least two incident surfaces of the light guide to sequentially generate three primary colors.

Figure 14:
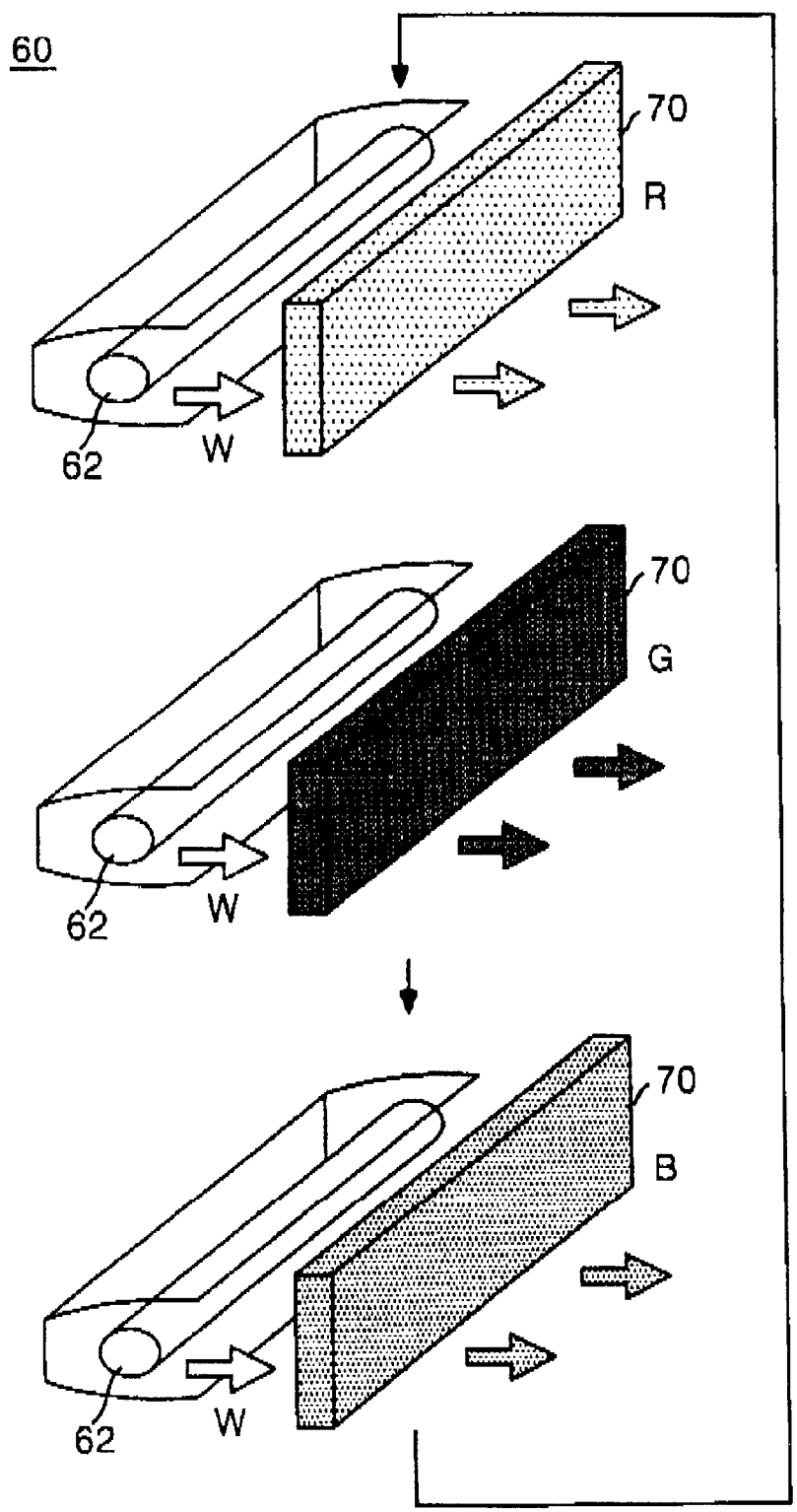
FIG. 14 is a view for explaining a driving method of the color-filterless liquid crystal display device of FIG. 8A and 8B.

Hereinafter, a method of driving a color-filterless LCD according to the present invention will be described with reference to FIG. 14. The three primary color selector 70 sequentially generates R, G and B colors from a white light beam generated by the lamp 62. In this case, the color switching of the three primary color selector 70 is synchronized with that of the TFT's in the liquid crystal display. Accordingly, when any one of three primary colors is selectively driven, an primary color light corresponding thereto is applied to the display. A structure of the back light may have a shape of FIG. 8A or FIG. 8B according a designer's choice. In this case, three primary colors are sequentially generated with the aid of the three primary color selector 70 implemented in compliance with the implementation examples as shown in FIG. 9A to FIG. 13 to realize full color.

Figure 15A:
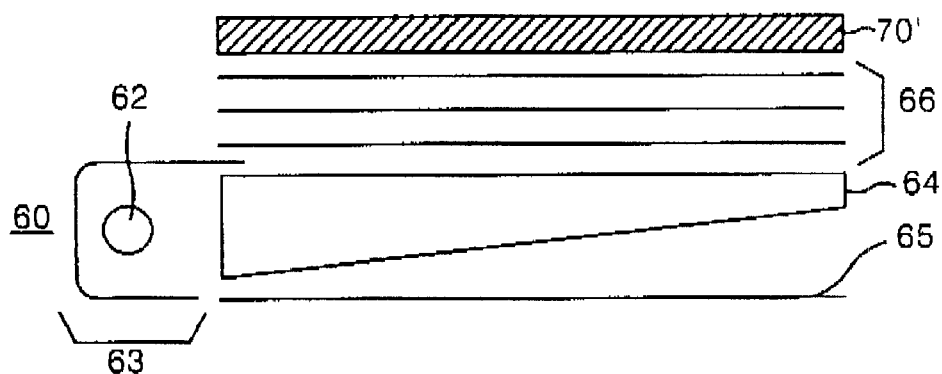
FIG. 15A to FIG. 15C are schematic section views showing a configuration of a back light unit of a color-filterless liquid crystal display device according to another embodiment of the present invention.
Figure 15B:
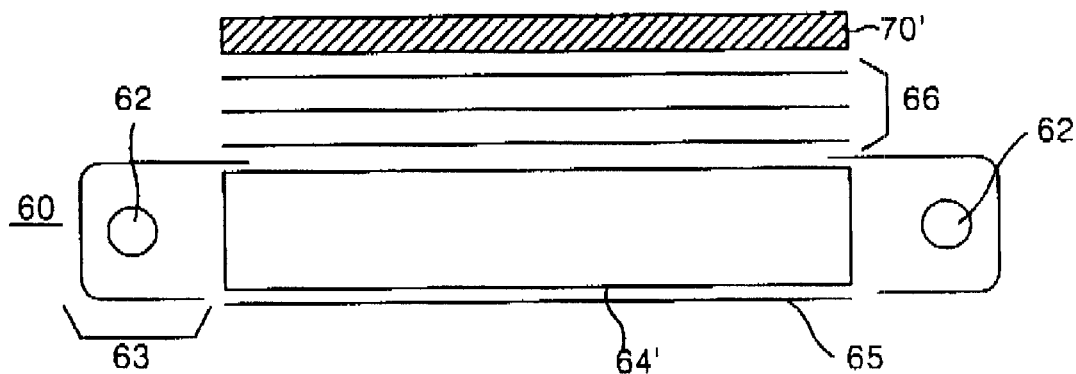
Figure 15C:
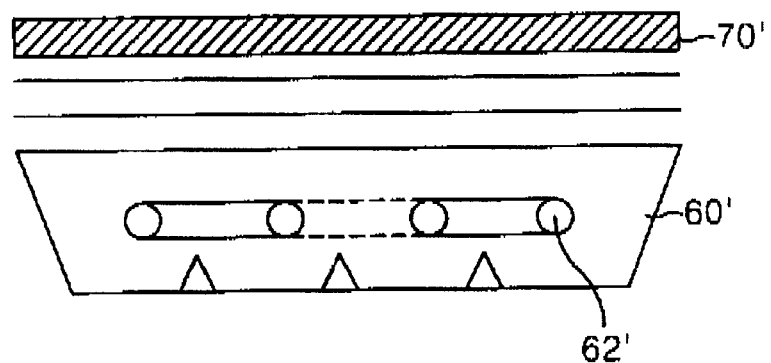

Referring now to FIGS. 15A to 15C, there is shown a back light unit 60 of a color-filterless LCD according to another embodiment of the present invention. The back light unit 60 includes a three primary color selector 70' arranged at the upper portion or the lower portion of a diffusing sheet 66 to be opposed to a light guide 64. The three primary color selector 70' selectively generates three primary color light beams sequentially color-by-color. Since an implementation of the three primary color selector 70 above has been sufficiently described, a detailed explanation as to the various design configurations of the three primary color selector 70' will be omitted. In a side light system of FIG. 15A, the three primary color selector 70' is provided at the upper portion of a back light unit 60 having a wedge-shaped light guide 64 to sequentially generate three primary colors. In a side light system of FIG. 15B, the three primary color selector 70' is provided at the upper portion of a back light unit 60 having a flat panel-shaped light guide 64' to sequentially generate three primary colors. On the other hand, in FIG. 15C, the three primary color selector 70' is provided at the upper portion of the back light unit having light sources 62' within the light refractor 60' and directly under the selector 70' to sequentially generate three primary colors.

Figure 16:
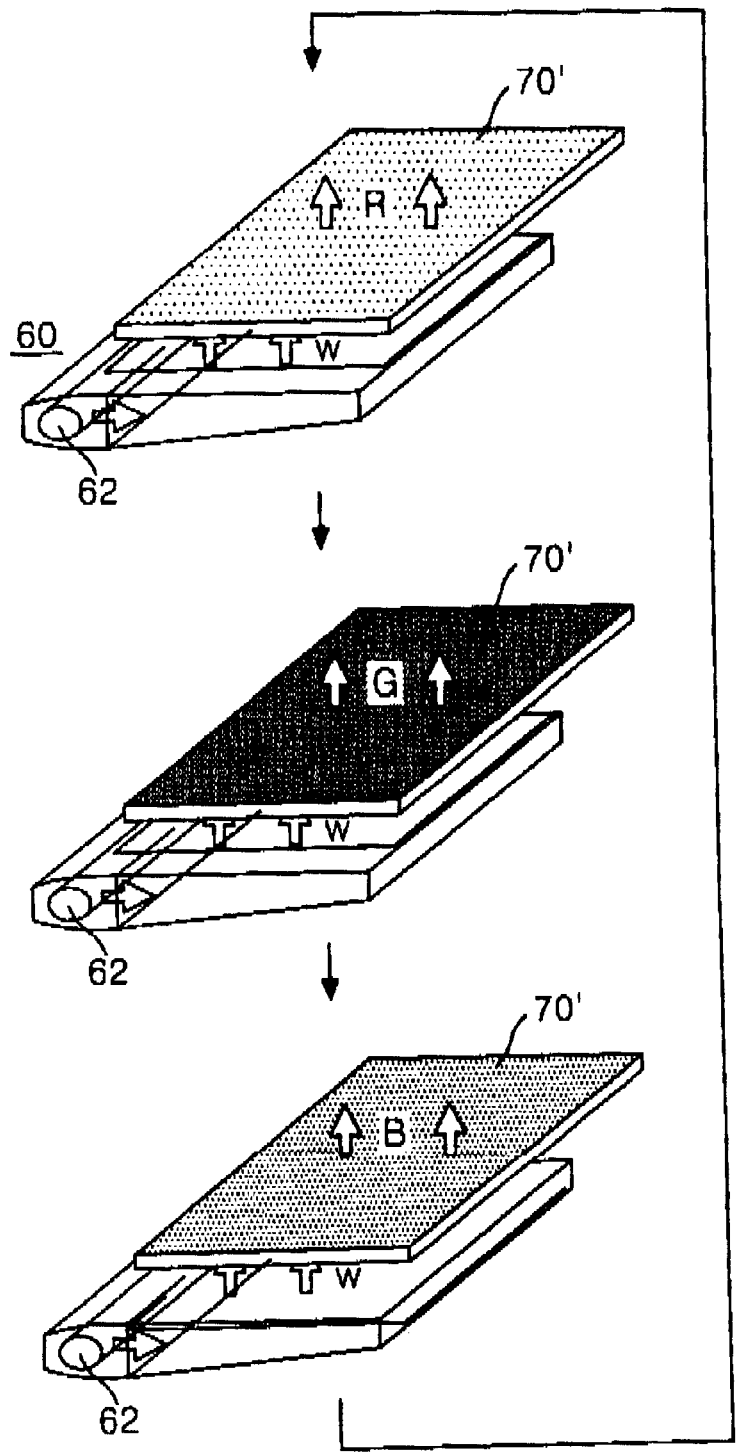
FIG. 16 is a view for explaining a driving method of the color-filterless liquid crystal display device of FIGS. 15A and 15B.

A method of driving the color-filterless LCD according to the present invention will be described with reference to FIG. 16. A white light beam generated from the lamp 62 of the back light 60 sequentially generates R, G and B colors by passing through the three primary color selector 70'. In this case, a switching of the three primary color selector 70' is synchronized with that of TFT's in the picture display. Accordingly, any one of three primary colors is selectively driven, a primary color light corresponding thereto is applied. In this case, three primary colors are sequentially generated with the aid of the three primary color selector 70' to realize a full color.

As described above, since the color-filterless LCD according to the embodiments of the present invention uses the three primary color selector so as to realize a full color display, it eliminates a use of a color filter to reduce a manufacturing cost. Since the present color-filterless LCD does not require three sub-pixels for implementing one pixel, it is capable of a simplified manufacturing process to improve both its process yield and aperture ratio. Also, the independent light sources 12 corresponding to three primary colors are replaced by a single light source, so that it is light utilization efficiency is optimized and a slim-type LCD is provided.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. For example, though red, green, and blue primary colors were illustrated, other combinations of colors are possible to obtain a full color display. Also, the back light is not the only possible location for the primary color selector, which may be located anywhere in the optical path of the light source (e.g., above the back light), including in the liquid crystal display panel. Accordingly, the scope of the invention shall be determined only by the appended claims and their equivalents.

What is claimed is:

1. A liquid crystal display device, comprising:
   a liquid crystal panel;
   a light source to generate light for illuminating the liquid crystal panel;
   a light guide to guide light from the light source to the liquid crystal panel; and
   a three primary color selector, having only one light selection member, optically coupled to the light source to sequentially generate three original color light beams from incident light from the light source.

2. The liquid crystal display device according to claim 1, wherein the three primary color selector is arranged between the light source and the light guide.

3. The liquid crystal display device according to claim 2, wherein the three primary color selector includes:
   a color filter.

4. The liquid crystal display device according to claim 2, wherein the three primary color selector includes:
    liquid crystal material blended with a dichroic dye.

5. The liquid crystal display device according to claim 2, wherein the three primary color selector includes:
    a liquid crystal layer;
    any one of a structure having a plurality of layers having different refractive indices to control a refractive index of the liquid crystal layer, an accousto-optical structure to control the refractive index of the liquid crystal layer, and an electro-mechanical structure to control the refractive index of the liquid crystal layer.

6. The liquid crystal display device according to claim 2, wherein the three primary color selector includes:
    a holographic optical element.

7. The liquid crystal display device according to claim 2, wherein the three primary color selector is arranged at one end of the light guide, and wherein the device further comprises:
    another light source arranged at another end of the light guide; and
    another three primary color selector arranged between the another light source and the light guide to sequentially generate three primary color light beams from incident light from the another light source.

8. The liquid crystal display device according to claim 1, wherein the three primary color selector is arranged between the light guide and the liquid crystal panel.

9. The liquid crystal display device according to claim 8, wherein the light source is arranged at an end of the light guide, which re-directs light upward toward the three primary color selector.

10. The liquid crystal display device according to claim 8, wherein the light source is arranged within the light refractor.

11. The liquid crystal display device according to claim 8, wherein the three primary color selector includes:
    a color filter.

12. The liquid crystal display device according to claim 8, wherein the three primary color selector includes:
    liquid crystal material blended with a dichroic dye.

13. The liquid crystal display device according to claim 8, wherein the three primary color selector includes:
    a liquid crystal layer;
    any one of a structure having a plurality of layers having different refractive indices to control a refractive index of the liquid crystal layer, an accousto-optical structure to control the refractive index of the liquid crystal layer, and an electro-mechanical structure to control the refractive index of the liquid crystal layer.

14. The liquid crystal display device according to claim 8, wherein the three primary color selector includes:
    a holographic optical element.

15. The liquid crystal display device according to claim 9, further comprising:
    another light source arranged at another end of the light guide; and
    another three primary color selector arranged between the another light source and the light guide to sequentially generate three primary color light beams from incident light from the another light source.

16. A back light unit for use in a display device, the unit comprising:
    a light source to generate light;
    a light guide to guide light from the light source; and
    a color selector, having only one light selection member, arranged in an optical path of the light source to sequentially transmit a plurality of colors within incident light from the light source.

17. The back light unit according to claim 16, wherein the color selector is arranged between the light source and the light guide.

18. The back light unit according to claim 16, wherein the color selector is arranged above the light guide.

19. The back light unit according to claim 16, wherein the color selector includes:
    a color filter.

20. The back light unit according to claim 16, wherein the color selector includes:
    liquid crystal material blended with a dichroic dye.

21. back light unit according to claim 16, wherein the color selector includes:
    a liquid crystal layer;
    any one of a structure having a plurality of layers having different refractive indices to control a refractive index of the liquid crystal layer, an accousto-optical structure to control the refractive index of the liquid crystal layer, and an electro-mechanical structure to control the refractive index of the liquid crystal layer.

22. The back light unit according to claim 16, wherein the color selector includes:
    a holographic optical element.

23. The back light unit according to claim 16, wherein the color selector is arranged at one end of the light guide, and wherein the unit further comprises:
    another light source arranged at another end of the light guide; and
    another color selector arranged between the another light source and the light guide to sequentially generate three primary color light beams from incident light from the another light source.

24. A liquid crystal display device, comprising:
    a liquid crystal panel;
    a light source to generate light for illuminating the liquid crystal panel;
    a light guide to guide light from the light source to the liquid crystal panel;
    a three primary color selector, arranged between the light guide and the liquid crystal panel, and optically coupled to the light source to sequentially generate three original color light beams from incident light from the light source, said light source being arranged at an end of the light guide, which re-directs light upward toward the three primary color selector;
    another light source arranged at another end of the light guide; and another three original color selector arranged between the another light source and the light guide to sequentially generate three original color light beams from incident light from the another light source.

* * * * *